(12) United States Patent
Guzik et al.

(10) Patent No.: US 11,516,427 B2
(45) Date of Patent: Nov. 29, 2022

(54) PORTABLE RECORDING DEVICE FOR REAL-TIME MULTIMEDIA STREAMS

(71) Applicants: Getac Technology Corporation, Taipei (TW); WHP Workflow Solutions, Inc., North Charleston, SC (US)

(72) Inventors: Thomas Guzik, Edina, MN (US); Muhammad Adeel, Edina, MN (US)

(73) Assignees: Getac Technology Corporation, Taipei (TW); WHP Workflow Solutions, Inc., North Charleston, SC (US)

(*) Notice: Subject to any disclaimer, the term of this patent is extended or adjusted under 35 U.S.C. 154(b) by 35 days.

(21) Appl. No.: 17/179,908

(22) Filed: Feb. 19, 2021

(65) Prior Publication Data

US 2021/0176422 A1 Jun. 10, 2021

Related U.S. Application Data

(60) Continuation of application No. 16/677,545, filed on Nov. 7, 2019, now Pat. No. 10,958,868, which is a
(Continued)

(51) Int. Cl.
*H04N 5/91* (2006.01)
*H04N 7/18* (2006.01)
(Continued)

(52) U.S. Cl.
CPC .............. *H04N 5/91* (2013.01); *H04L 63/30* (2013.01); *H04N 5/38* (2013.01); *H04N 5/77* (2013.01); *H04N 5/772* (2013.01); *H04N 7/18* (2013.01); *H04N 7/185* (2013.01); *H04N 9/8205* (2013.01); *H04W 12/06* (2013.01);
(Continued)

(58) Field of Classification Search
CPC . G06T 2207/30232; G06T 2207/30196; G06T 2207/30212; G06T 2207/30236; H04N 21/4532; H04N 21/4622; H04N 21/2668; H04N 21/25891; H04N 7/185; H04N 5/232933; G06V 20/50;
(Continued)

(56) References Cited

U.S. PATENT DOCUMENTS 9,615,136 B1\* 4/2017 Emery ................. G06F 16/743
2005/0283470 A1\* 12/2005 Kuntzman ............ G06F 16/353
707/E17.084
(Continued)

OTHER PUBLICATIONS

U.S. Appl. No. 15/686,142, Non Final Office Action dated Apr. 8, 2019, 19 pages.
(Continued)

*Primary Examiner* — Jared Walker
(74) *Attorney, Agent, or Firm* — Han Santos, PLLC

(57) ABSTRACT

This disclosure describes a portable recording device that is configured to capture real-time multimedia data from a surrounding environment. The portable recording device may comprise one or more sensors to capture the real-time multimedia data, a category selector to selectively toggle between preset positions that designate a category classification to the real-time data, and an activation button to trigger one or more actions relating to the capture of the real-time multimedia data.

20 Claims, 11 Drawing Sheets

Related U.S. Application Data division of application No. 15/686,142, filed on Aug. 24, 2017, now Pat. No. 10,511,801.

(60) Provisional application No. 62/379,212, filed on Aug. 24, 2016.

(51) Int. Cl.

| | |
|---|---|
| *H04N 9/82* | (2006.01) |
| *H04W 12/06* | (2021.01) |
| *H04N 5/38* | (2006.01) |
| *H04L 9/40* | (2022.01) |
| *H04N 5/77* | (2006.01) |
| *H04N 21/436* | (2011.01) |
| *G06Q 50/26* | (2012.01) |
| *H04N 21/4367* | (2011.01) |

(52) U.S. Cl.
CPC .......... *G06Q 50/26* (2013.01); *H04L 63/0876* (2013.01); *H04N 21/4367* (2013.01); *H04N 21/43622* (2013.01)

(58) Field of Classification Search
CPC ...... G06V 10/40; G06V 40/172; G06V 20/35; G06V 20/38; G06V 20/39; G06V 20/52; G06V 20/56
See application file for complete search history.

(56) References Cited

U.S. PATENT DOCUMENTS

| | | | | |
|---|---|---|---|---|
| 2009/0027499 | A1* | 1/2009 | Nicholl | H04N 7/18 348/158 |
| 2010/0118163 | A1* | 5/2010 | Matsugu | H04N 5/23219 348/E5.024 |
| 2010/0274816 | A1* | 10/2010 | Guzik | G11B 27/034 348/207.99 |
| 2011/0018998 | A1* | 1/2011 | Guzik | H04W 4/029 348/143 |
| 2014/0104396 | A1* | 4/2014 | Salow | H04L 65/765 348/47 |
| 2014/0143545 | A1* | 5/2014 | McKeeman | H04L 63/08 713/168 |
| 2014/0267650 | A1* | 9/2014 | Wexler | G06V 30/414 348/62 |
| 2016/0062992 | A1* | 3/2016 | Chen | G06F 12/0246 707/736 |
| 2016/0227173 | A1* | 8/2016 | Yamaguchi | H04N 5/23206 |
| 2016/0275376 | A1* | 9/2016 | Kant | G06V 10/147 |
| 2016/0360088 | A1* | 12/2016 | Tanabiki | B60R 11/04 |
| 2016/0364616 | A1* | 12/2016 | McLean | G06F 3/04842 |
| 2017/0150037 | A1* | 5/2017 | Rathod | G06F 16/51 |
| 2018/0160053 | A1* | 6/2018 | Tsuchiya | H04N 5/2621 |

OTHER PUBLICATIONS

U.S. Appl. No. 15/686,142, Notice of Allowance dated Jul. 31, 2019, 21 pages.

U.S. Appl. No. 15/686,142, Restriction Requirement dated Feb. 8, 2019, 10 pages.

U.S. Appl. No. 16/677,545, Notice of Allowance dated Nov. 19, 2020, 30 pages.

* cited by examiner

PORTABLE RECORDING DEVICE FOR REAL-TIME MULTIMEDIA STREAMS

RELATED APPLICATIONS

This application claims priority to a commonly owned U.S. Provisional Patent Application No. 62/379,212, filed on Aug. 24, 2016, and titled, "Category selector for body camera data classification," a commonly owned U.S. Non-Provisional patent application Ser. No. 15/686,142, filed on Aug. 24, 2017, and titled "Portable Recording Device Multimedia Classification System," now U.S. Pat. No. 10,511, 801, and a commonly owned U.S. Non-Provisional patent application Ser. No. 16/677,545, filed on Nov. 7, 2019, titled "Portable Recording Device Multimedia Classification System," which are herein incorporated by reference in their entirety.

BACKGROUND

Law enforcement agencies are increasingly equipping their law enforcement officers with portable recording devices. Such law enforcement agencies may have policies mandating that their law enforcement officers use these portable recording devices to record their interactions with the public, to better serve and protect the public from improper policing, as well as protect law enforcement officers from false allegations of police misconduct. In some examples, law enforcement officers may use data recorded by a portable recording device to annotate incident report forms. However, the task of generating incident forms from individual instances of multimedia captured by a portable recording device can be a laborious task that requires a significant time commitment from a law enforcement officer, detracting from their other official duties.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1A:
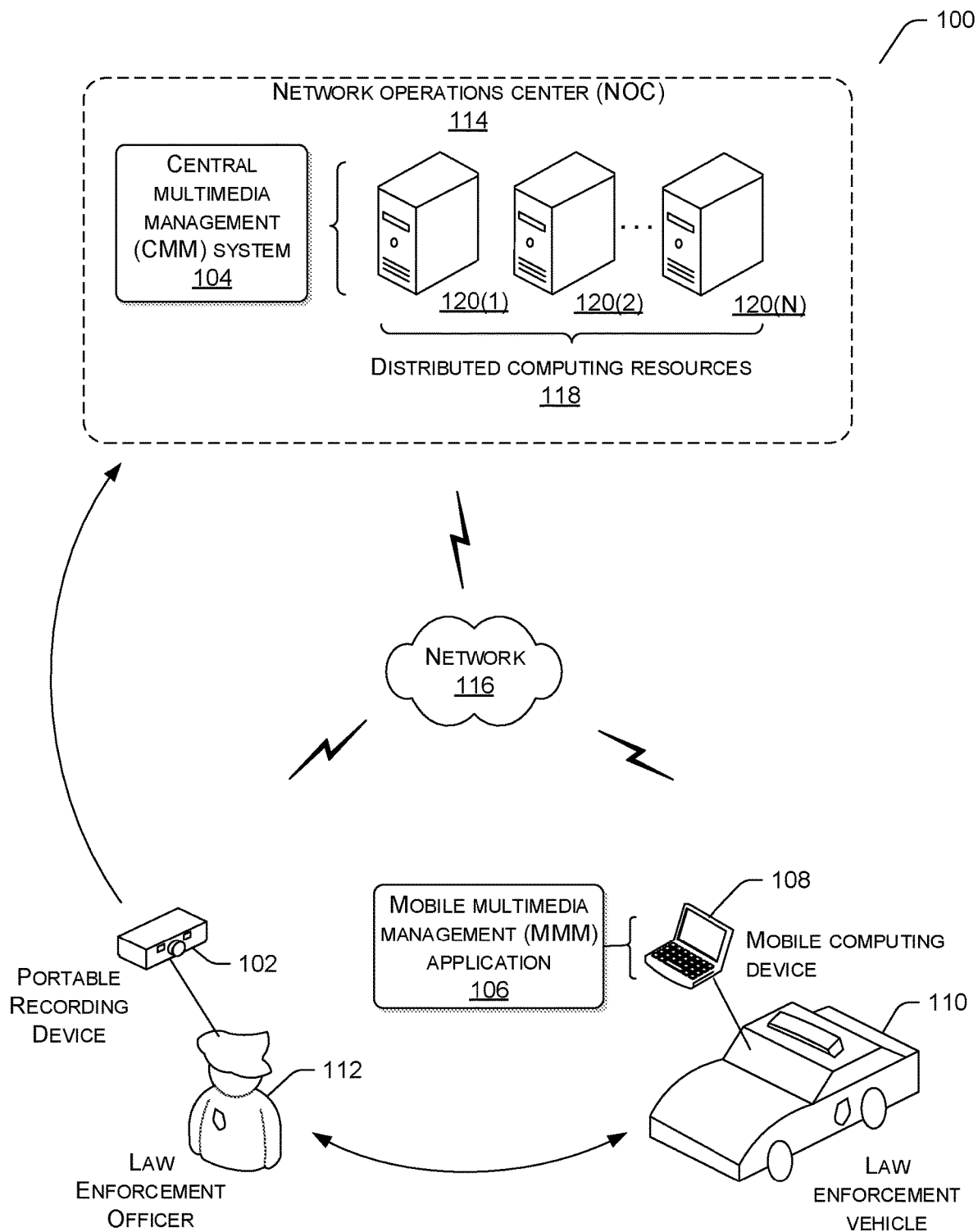
FIGS. 1A and 1B illustrate a schematic view of a computing environment that facilitates an interaction between a portable recording device, a central multimedia management system, and a mobile multimedia management system.

This disclosure describes an apparatus and system for classifying audio and video data captured by a portable recording device. The portable recording device may comprise a camera system enclosure that is worn on a user's torso and may capture audio and video data that reflects a user's point-of-view perception of their surroundings. In some examples, video and/or audio data may be transmitted by the portable recording device in real-time to one or more computing devices, via one or more networks. Alternatively, or additionally, the video and/or audio data may be stored within memory of the portable recording device.

Additionally, this disclosure further describes a portable recording device with a category selector that is capable of assigning a category classification to video and/or audio data that is being captured by the portable recording device. The category selector may take the form of any switching mechanism that can toggle between one or more preset positions. Each preset position may correspond to a particular category classification. In a non-limiting example, category classifications may correspond to the roles and responsibilities of users that wear portable recording devices. For example, the preset category classifications for a patrol officer may include speeding citations, traffic citations, motorist assist, emergency response, and/or so forth. Similarly, category classifications for detectives may include emergency response, arrest, assist another agency, and inspections. The purpose of assigning a category classification to captured video and/or audio data is to increase the efficiency of evidence management and classification. That is, video and audio data that is transmitted by the portable recording device to a Central Multimedia Management (CMM) system at a network operations center (NOC), or another mobile computing device, may be transmitted simultaneously with metadata classifying the data into a category that corresponds with departmental evidence group policies.

In various examples, the central multimedia management (CMM) system may act as a central repository of multimedia data from one or more portable recording device(s) operated by law enforcement officers. Further, the CMM system may generate and assign incident report forms for each individual instance of real-time data that is recorded by a portable recording device. By way of example, the CMM system may automatically populate an incident report form using segmented portions of a real-time data recording (i.e. real-time data may be segmented based on milestone indicator metadata), along with metadata received from the portable recording device. The metadata may relate to individual instances of real-time data or the portable recording device itself. For example, the metadata that relates to individual instances of real-time data recordings may include a timestamp and/or a date stamp associated with each instance of real-time data, or a GPS location of the portable recording device at a point in time that the real-time data is captured. Additionally, or alternatively, the metadata may be derived from one or more selections performed via the portable recording device, and may include one or more of a category selection, a sub-category selection, or milestone indicator(s). Further, the metadata that relates to the portable recording device itself may include a device identifier or an assignment identifier of a law enforcement officer who is assigned to operate the portable recording device.

Additionally, this disclosure further describes techniques that allow the portable recording device to act as a portable wireless hotspot that provides a wireless communication connection to an authorized mobile computing device. In doing so, the mobile computing device, via the mobile multimedia management (MMM) system, may initiate receipt of multimedia data packets from the portable recording device, and further transmit user-modified multimedia data packets to the portable recording device. By way of example, consider a law enforcement officer operating a portable recording device with internet access via a telecommunications network. In this example, the law enforcement officer may establish a secure communication connection with the mobile computing device via the telecommunications network associated with the portable recording device. In doing so, the MMM application, via the mobile computing device, may initiate receipt of multimedia data packets from the portable recording device. The MMM application may further generate, via the mobile computing device, an incident report form that is based on a stream of real-time data and corresponding metadata associated with the multimedia data packet. In this instance, the law enforcement officer may enter or adjust information within the incident report form, such as case identifiers, pertinent individual personal information (i.e. name, address, date of birth, and/or so forth), category classifications, sub-category classifications, milestone indicator(s), audio annotations, text annotations, and/or so forth. In doing so, the MMM application may generate user-modified metadata based on the information entered or adjusted in creating the incident report form. Further, the MMM application may generate a user-modified multimedia data packet that aggregates the user-modified metadata with the stream of real-time data and corresponding metadata that was originally sent to the mobile computing device from the portable recording device. The MMM application may further cause the mobile computing device to transmit the user-modified multimedia data packet to the portable recording device, via the secure communication connection, to replace the original multimedia data packet stored on the portable recording device. The purpose of doing so ensures that the user-modified multimedia data packet is later uploaded from the portable recording device to the CMM system, rather than to the multimedia data packet that does not include the user input of data entries. In this way, the data entries, annotations, and modifications, implemented by the assigned personnel, via the mobile computing device, are uploaded to the CMM system.

It is noteworthy that the terms "law enforcement officer" and "assigned operator of the portable recording device" are used interchangeably throughout this disclosure.

Further, the term "techniques," as used herein, may refer to system(s), method(s), computer-readable instruction(s), module(s), algorithms, hardware logic, and/or operation(s) as permitted by the context described above and through the document. Example implementations are provided below with reference to FIG. 1 through to 9.

FIG. 1A illustrates a schematic view of a computing environment 100 that facilitates an interaction between a portable recording device 102, a central multimedia management (CMM) system 104, and the mobile multimedia management (MMM) application 106 operating on a mobile computing device 108. The computing environment 100 may further include a law enforcement vehicle 110 operated by a law enforcement officer 112 that is equipped with the mobile computing device 108. Further, the mobile computing device 108 may communicate with the portable recording device 102 via one or more network(s) 116.

In the illustrated example, the CMM system 104 may be part of a Network Operations Center (NOC) 114. The NOC 114 may be a command center that is part of a law enforcement agency, or a facility that is operated by a third-party that is offering services to a law enforcement agency. The CMM system 104 may operate on one or more distributed computing resource(s) 118. The one or more distributed computing resource(s) 118 may include one or more computing device(s) 120(1)-120(N) that operate in a cluster or other configuration to share resources, balance load, increase performance, provide fail-over support or redundancy, or for other purposes. The one or more computing device(s) 120(1)-120(N) may include one or more interfaces to enable communications with other networked devices, such as a portable recording device 102 or a mobile computing device 108 associated with a law enforcement vehicle 110, via one or more network(s) 116. The one or more network(s) 116 may include public networks such as the Internet, private networks such as an institutional and/or personal intranet, or some combination of private and public networks. The one or more network(s) 116 can also include any type of wired and/or wireless network, including but not limited to local area network (LANs), wide area networks (WANs), satellite networks, cable networks, Wi-Fi networks, Wi-Max networks, mobile communications networks (e.g. 3G, 4G, and so forth), or any combination thereof. Protocols for network communication, such as TCP/IP, may be used to implement a communication connection via the one or more network(s) 116.

Further, the mobile computing device 108 may include any sort of electronic device, such as a cellular phone, a smartphone, a tablet computer, a personal computer (PC), a laptop computer, etc. The mobile computing device 108 may include output devices (e.g. a display screen) upon which data relating to incident report forms and real-time data recordings may be displayed. The mobile computing device 108 may also include an input device (e.g. a keyboard or mouse) by which the law enforcement officer 112 may enter information. The mobile computing device 108 may be equipped with a low-energy transceiver and a high-energy transceiver. For example, the low-energy transceiver may be a Bluetooth or an NFC transceiver, while the high-energy transceiver may be a Wi-Fi transceiver. In some instances, the mobile computing device 108 may be further equipped with a power port (e.g. a Universal Serial Bus (USB) port, a Lightning port, etc.) that provides power and communication interfaces.

The portable recording device 102 may be worn by the law enforcement officer 112 while performing official duties. The portable recording device 102 may be a portable video recording device, a portable audio recording device, or a portable multimedia recording device that records image data (i.e. in-motion video image data or still-motion image data) and audio data via one or more sensors. The one or more sensors may include microphones, video image sensors, and/or so forth. The portable recording device 102 may include on-board memory that stores instances of captured audio data, image data, or multimedia data, as real-time data. The portable recording device 102 may be manually activated to record real-time data by the law enforcement officer 112. For example, the portable recording device 102 may include an input interface (e.g. physical buttons, a gesture recognition mechanism, a voice activation mechanism) that enables the law enforcement officer 112 to start, stop, and/or pause the recording of the real-time data. In various examples, the real-time data may capture incidents, events, crimes, and/or so forth, that are of law enforcement or public interest as the law enforcement officer 112 performs official duties.

Figure 1B:
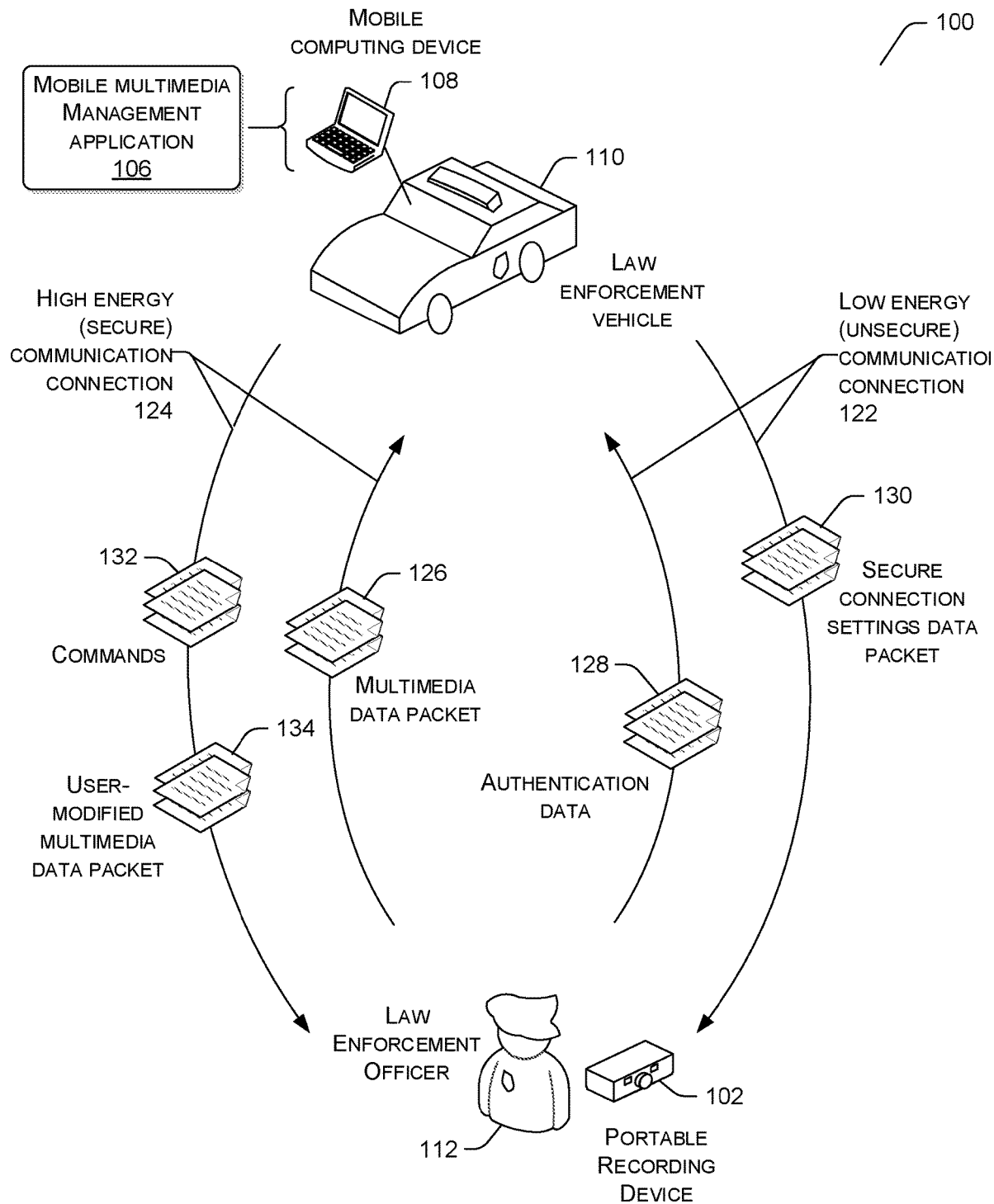

FIG. 1B illustrates a schematic view of a computing environment 100 that facilitates an interaction between a portable recording device 102 and a mobile computing device 108. The mobile computing device 108 may be associated with a law enforcement vehicle 110 that is operated by a law enforcement officer 112. Further, the mobile computing device 108 may operate the mobile multimedia management (MMM) application 106 that interacts with the portable recording device 102.

In the illustrated example, the portable recording device 102 may use a low-energy transceiver to form a low-energy (i.e. unsecured) communication connection 122 with the mobile computing device 108. In some examples, the portable recording device 102 may broadcast a heartbeat signal that includes a device identifier of the portable recording device. In one example, the portable recording device 102 may broadcast the heartbeat signal continuously or based on a predetermined schedule. The time interval associated with the predetermined schedule may be one second, 10 seconds, or 30 seconds. Any time interval is possible. For example, the portable recording device 102 may broadcast the heartbeat signal every second.

In one example, the mobile computing device 108 may act as a Wi-Fi access point and the portable recording device 102 may act as a Wi-Fi client. For example, following receipt of the heartbeat signal, the mobile computing device 108 may transmit a device identifier acknowledgment message to the portable recording device 102 that causes the portable recording device 102 to transmit authentication data 128 to the mobile computing device 108. In response to verifying the authenticity of the authentication data 128, the mobile computing device 108 may transmit a secure connection settings data packet 130 to the portable recording device 102 via the low-energy (i.e. unsecured) communication connection 122. Upon receiving the secure connection settings data packet 130, the portable recording device 102 may establish a high-energy (i.e. secure) communication connection 124 with the mobile computing device 108. Thus, in the case of a Wi-Fi connection, the mobile computing device 108 may act as a Wi-Fi access point and the portable recording device 102 may act as a Wi-Fi client.

In another example, the portable recording device 102 may act as a Wi-Fi access point and the mobile computing device 108 may act as a Wi-Fi client. In this example, following receipt of the heartbeat signal, and verification of the authentication data 128 associated with the portable recording device 102, the mobile computing device 108 may transmit an additional acknowledgment message to the portable recording device 102 that causes the portable recording device 102 to transmit a secure connection settings data packet 130. Upon receiving the secure connection settings data packet 130, the mobile computing device 108 may establish a high-energy (i.e. secure) communication connection 124 with the portable recording device 102. Thus, in the case of a Wi-Fi connection, the portable recording device 102 may act as a Wi-Fi access point and the mobile computing device 108 may act as a Wi-Fi client.

In one example, the high-energy (i.e. secure) communication connection 124 may be used by the mobile computing device 108 to send commands 132 to the portable recording device 102. The commands 132 may configure camera resolution, video buffer, buffering duration, pre-buffer audio mute, image stability, activation of GPS, and category/sub-category classification identifiers associated with preset positions for the category selector of the portable recording device. In one example, the commands 132 may initiate a file transfer of multimedia data packet(s) 126 from the portable recording device 102, to the mobile computing device 108. In doing so, the mobile computing device 108 may generate an incident report form associated with the multimedia data packet(s) 126. The incident report form may include segmented portions of a real-time data recording (i.e. real-time data may be segmented based on milestone indicator metadata), along with metadata received from the portable recording device 102. Further, a law enforcement officer 112 may modify the incident report form, via the mobile computing device 108, to include audio annotations or text annotations. In doing so, the mobile computing device 108 may generate a user-modified multimedia data packet 134 by aggregating the incident report form as additional metadata, along with the original content of respective multimedia data packet(s) 126. The purpose of doing so is to ensure that any multimedia data packets uploaded from the portable recording device 102 to the CMM system 104 include annotations and modifications made by the law enforcement officer 112 via the mobile computing device 108. Alternatively, the exchange of multimedia data packets may be made between the mobile computing device 108 and the CMM system 104, in response to establishing a high energy (i.e. secure) communication connection between the mobile computing device 108 and the CMM system 104.

It is noteworthy that the authentication process between the mobile computing device and the portable recording device may be based on the portable recording device being assigned to a law enforcement officer that is operating the mobile computing device. In this example, the MAIM application operating on the mobile computing device may have access to an assignment table maintained by the CMM system to ensure that a proper assignment of the portable recording device is in place.

Figure 2:
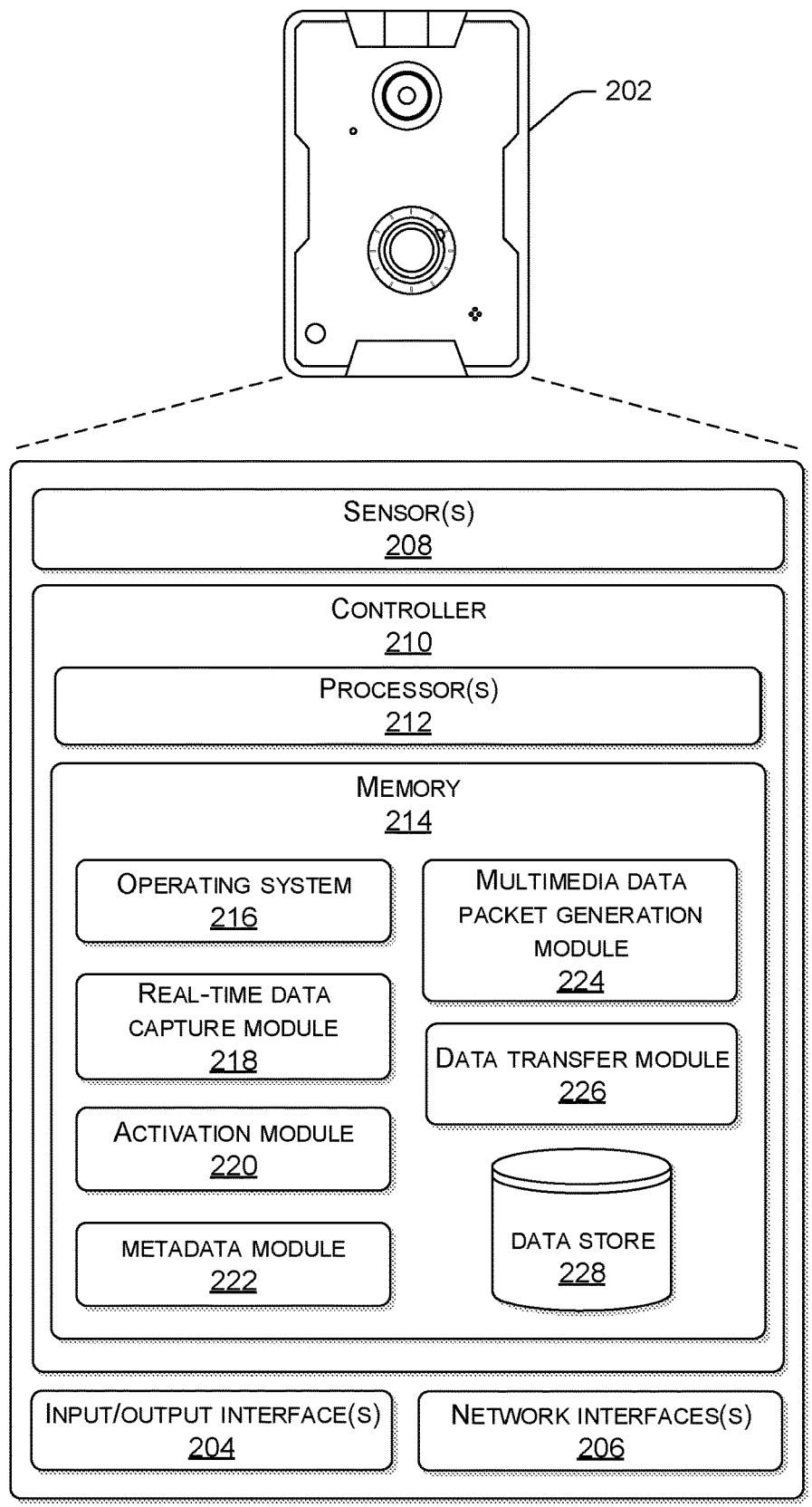
FIG. 2 illustrates a block diagram of various components of a portable recording device that facilitates a recording or a stream of real-time data.

FIG. 2 illustrates a block diagram of various components of a portable recording device that facilitates a recording or a stream of real-time data. Further, the portable recording device 202 may be configured to generate and assign metadata to individual instances of real-time data. The portable recording device 202 may be equipped with input/output interface(s) 204, network interface(s) 206, one or more sensor(s) 208, and a controller 210. Input/output interface(s) 204 may include output interfaces, such as a speaker, a vibrating mechanism, or a tactile feedback mechanism. The input/output interface(s) 204 may also include ports for one or more peripheral devices, such as headphones or peripheral speakers. The input/output interface(s) 204 may further one or more physical buttons/switches, gesture recognition mechanisms, a voice activation mechanism, or the like. By way of example, the one or more buttons/switches may include an activation button, a mode button, a category selector, or a connectivity wake-up button. The one or more buttons/switches are discussed in more detail with reference to FIGS. 5 and 6.

Additionally, the one or more sensor(s) 208 may include a camera and a microphone to capture video image data and audio data, and a GPS sensor to detect the geolocation of the portable recording device 202.

Further, the network interface(s) 206 may include any sort of transceiver known in the art. The network interface(s) 206 may include a radio transceiver that performs the function of transmitting and receiving radio frequency communications via an antenna. In addition, the network interface(s) 206 may also include a wireless communication transceiver and a near field antenna for communicating over unlicensed wireless Internet Protocol (IP) networks, such as local wireless data networks and personal area networks (e.g. Bluetooth or near field communication (NFC) networks). Further, the network interface(s) 206 may include wired communication components, such as an Ethernet port or a Universal Serial Bus (USB).

Moreover, the controller 210 of the portable recording device 202 may include routines, program instructions, objects, and/or data structures that perform particular tasks or implement abstract data types. The controller 210 may include one or more processor(s) 212 that are operably connected to memory 214. In at least one example, the one or more processor(s) 212 may be a central processing unit(s) (CPU), graphics processing unit(s) (GPU), both a CPU and a GPU, or any other sort of processing unit(s). Each of the one or more processor(s) 212 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 212 may also be responsible for executing all computer applications stored in the memory, which can be associated with common types of volatile (RAM) and/or nonvolatile (ROM) memory.

In some examples, memory 214 may include system memory, which may be volatile (such as RAM), non-volatile (such as ROM, flash memory, etc.) or some combination of the two. The memory may also include additional data storage devices (removable ad/or non-removable) such as, for example, magnetic disks, optical disks, or tape.

The memory 214 may further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 214 may include an operating system 216, a real-time data capture module 218, an activation module 220, a metadata module 222, a multimedia data packet generation module 224, a data transfer module 226, and a data store 228. The operating system 216 may be any operating system capable of managing computer hardware and software resources.

Further, the real-time data capture module 218 may record real-time data captured via a camera and/or a microphone of the portable recording device 202. The real-time data may be in the form of video data, audio data, and/or multimedia data. Accordingly, the real-time data capture module 218 may include codecs, signal filters, coding functions, and/or error correction functions that enable the real-time data capture module 218 to generate digital data from camera and microphone signal inputs.

The activation module 220 may receive one or more commands from a CMM system or an MMM application. In one example, the activation module 220 may repeatedly broadcast a heartbeat signal via a low-energy communication transceiver to verify whether a current high-energy communication connection is available. The heartbeat signal may include a device identifier of the portable recording device. Further, the activation module 220 may transmit authentication data to a CMM system or a MMM application, via a low-energy communication connection, in response to determining that a high-energy communication connection is available.

In another example, the activation module 220 may receive one or more commands from the CMM system or MMM application that activates the real-time data capture module 218 to capture and/or live stream of real-time data. The one or more commands may correspond to a start, stop, or pause command regarding a real-time data recording and/or live streaming. The activation module 220 may also receive manual inputs that start, stop, or pause the recording and/or live streaming of real-time data via physical buttons (i.e. activation button) of the portable recording device. During live streaming, the real-time data capture module 218 may compress motion image data and/or audio data that is captured by the one or more sensor(s) 208 using a loss or lossless compression (i.e. H.264, MPEG-4, etc.) for transmission to the CMM system or the MMM application, via the data transfer module 226. In turn, the data transfer module 226 may relay the compressed live stream to the CMM system or the MMM application.

The metadata module 222 may tag the real-time data that is captured by the real-time data capture module 218, with metadata. In some examples, the metadata may relate to the real-time data or the portable recording device 202 itself. For example, the metadata that relates to the real-time data may include a timestamp and/or a date stamp associated with each instance of real-time data, or a GPS location of the portable recording device 202 at a point in time that the real-time data is captured. Additionally, or alternatively, the metadata may be derived from one or more selections performed via the portable recording device 202, and may include one or more of a category selection, a sub-category selection, or milestone indicator(s). By way of example, a category selection may correspond to "patrol officers," "detectives," "special units," "assist another agency," etc. Further, a sub-category selection may depend on the original category selection. For example, sub-category selections that depend on the "patrol officers" category selection may include "speeding," "traffic citation," "motorist assist," and/or "emergency response." In another example, sub-category selections that depend on a "detectives" category selection may include "emergency response," "arrest," "assist other agency," or "inspection." In yet another example, sub-category selections that depend on a "special units" category selection may include "arrest," "assist another agency," "inspection," and/or "backup officer." It is noteworthy that each sub-category classification may have a further set of sub-sub-category classifications. For example, an "arrest" sub-category classification may include "known suspect," "unknown suspect," or "resisting suspect." Any number of sub-category classification levels (i.e. hierarchy of classification levels) is possible.

Moreover, the milestone indicator(s) may be captured by the law enforcement officer pressing an activation button of the portable recording device while recording a stream of real-time data. The milestone indicator(s) are intended to flag a point in time during the stream of real-time data that the law enforcement officer, or assigned operator of the portable recording device, has identified as being pertinent and/or significant to the incident, and as such may be addressed in detail by an audio annotation or text annotation within an ensuing incident report form. By way of example, consider a law enforcement officer, or assigned operator of the portable recording device, may record a stream of real-time data for a traffic citation. The law enforcement officer may initiate a milestone indicator during the interaction at a point in time when the cited individual becomes combative, or argumentative. The law enforcement officer may flag this point in time as a pertinent and/or a significant milestone of the interaction that may require additional audio or textual annotations within an incident report form.

Further, the metadata that relates to the portable recording device 202 itself may include a device identifier or an assignment identifier of a law enforcement officer who is assigned to operate the portable recording device.

Additionally, the metadata module 222 may receive additional input of descriptive data for real-time data that is input by a law enforcement officer, via a mobile computing device that operates a MMM application. The MMM application is described in further detail with reference to FIG. 4. In one example, the descriptive data may include audio annotations and/or text annotations (i.e. officer commentaries) that relate to an instance of real-time data. In another example, the descriptive data may include an incident identifier, an event identifier, a case number, an involved party name, and/or so forth. Alternatively, the law enforcement officer may provide a code word that is pre-assigned to represent an incident, an event, or a case.

The multimedia data packet generation module 224 may generate a multimedia data packet by aggregating each instance of real-time data captured by the portable recording device with associated metadata. Any descriptive data provided by a law enforcement officer via an MMM application may be aggregated within the multimedia data packet as metadata.

The data transfer module 226 may be configured to transfer a multimedia data packet to one of a CMM system at a NOC or an MMM application that is associated with a mobile computing device. The data transfer module 226 may be configured such that the multimedia data packet may be transferred via an established high-energy (secure) connection with one of the CMM system or MMM application.

The data store 228 may include one or more databases, such as relational databases, object databases, and/or key-value databases that store data. In one example, the data store 228 may store the real-time data captured by the portable recording device 202, along with associated metadata, and descriptive data input by a law enforcement officer.

Figure 3:
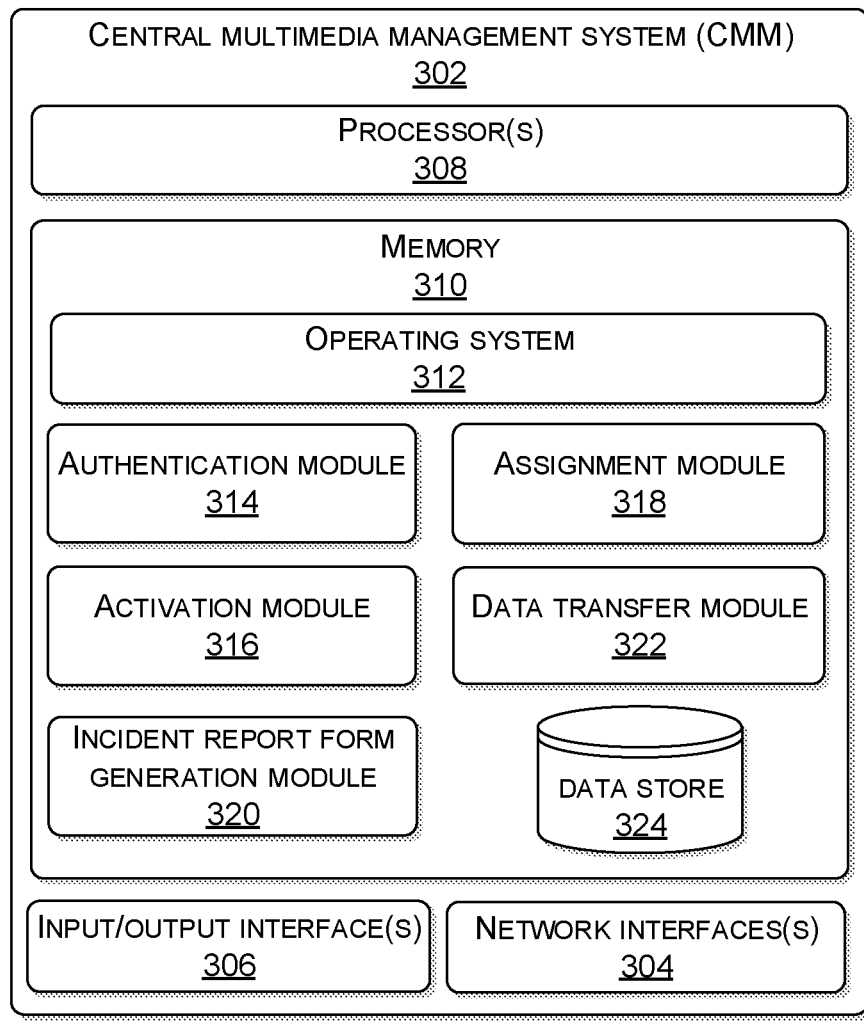
FIG. 3 illustrates a block diagram of various components of a Central Multimedia Management (CMM) System of a Network Operations Center.

FIG. 3 illustrates a block diagram of various components of a Central Multimedia Management (CMM) System 302 of a Network Operations Center (NOC). The CMM system 302 may correspond to CMM system 104. Further, the CMM system 302 may act as a central repository of multimedia data from one or more portable recording device(s) operated by law enforcement officers. Further, the CMM system may generate and assign incident report forms for each individual instance of real-time data that is recorded by a portable recording device.

In the illustrated example, the CMM system 302 may be coupled to a portable recording device via network interface(s) 304. The network interface(s) 304 may correspond to network interface(s) 206. In this example, the CMM system 302 may transmit one or more commands to a portable recording device via the network interface(s) 304, and further receive multimedia data packets from a portable recording device.

Further, the CMM system 302 may include input/output interface(s) 306. The input/output interface(s) 306 may include any type of output interface known in the art, such as a display (e.g. a liquid crystal display), speakers, a vibrating mechanism, or a tactile feedback mechanism. Input/output interface(s) 306 also include ports for one or more peripheral device(s), such as headphones, peripheral speakers, or a peripheral display. Further, the input/output interface(s) 306 may further include a camera, a microphone, a keyboard/keypad, or a touch-sensitive display. A keyboard/keypad may be a push-button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

In the illustrated example, the CMM system 302 may include one or more processor(s) 308 operably connected to memory 310. The one or more processor(s) 308 may correspond to the one or more processor(s) 212, and the memory 310 may correspond to the memory 214. The memory 310 may further include an operating system 312, an authentication module 314, an activation module 316, an assignment module 318, an incident report form generation module 320, a data transfer module 322, and a data store 324. The operating system 312 may be any operating system capable of managing computer hardware and software resources.

Further, the authentication module 314 may receive, via a low-energy (i.e. secure) communication connection, authentication data from a portable recording device. Authentication data may include the device identifier of the portable recording device, such as an electronic serial number (ESN), a globally unique identifier (GUID), an integrated circuit card identifier (ICCID), or any other unique digital identifier stored in the portable recording device. In response to verifying the authenticity of the authentication data, the authentication module 314 may transmit a secure connection setting data packet to the portable recording device. The secure connection settings data packet may include an access point identifier (i.e. Service Set Identifier (SSID)), the security encryption scheme type, and an access point password. Upon receipt of the secure connection settings data packet, the portable recording device may initiate a high-energy (i.e. secure) communication connection with the CMM system. In some examples, the secure connection setting data packet may include computer-executable instructions that automatically associate the secure connection settings with a connectivity wake-up button of the portable recording device, as discussed in more detail with reference to FIGS. 5 and 6. In doing so, the authentication module 314 need only transmit the secure connection settings data packet once to the portable recording device. Following an initial authentication process, the authentication module 314 may instead, transmit a signal to the portable recording device that activates (i.e. turns on) the connectivity wake-up button. In doing so, the portable recording device may establish a high-energy (i.e. secure) communication with the CMM system, based on the previously associated secure connection settings. It is noteworthy that the authentication module 314 may selectively transmit a secure connection settings data packet to a portable recording device, following an initial authentication process, to ensure that the portable recording device is using updated or up to date secure connection settings.

Additionally, the activation module 316 may receive a heartbeat signal that is broadcast by a portable recording device. The heartbeat signal may have been intended to determine whether a high-energy (i.e. secure) communication connection is available. In doing so, the activation module 316 may transmit an acknowledgment message to the portable recording device that causes the portable recording device to transmit authentication data, via a low-energy (i.e. unsecured) communication connection.

The activation module 316 may also transmit one or more commands to a portable recording device that are intended to initiate real-time data capture and/or live stream of real-time data. In this example, the one or more commands may correspond to a start, stop, or pause command of a real-time data recording and/or live streaming.

Moreover, the assignment module 318 may assign a portable recording device to a law enforcement officer. Once a portable recording device is assigned to a law enforcement officer, the real-time data that is recorded by the portable recording device from that point in time onward is assigned to the law enforcement officer. In one example, the assignment module 318 may assign a portable recording device to a law enforcement officer using an assignment table. The assignment table may associate a law enforcement officer identifier with a device identifier of a portable recording device. For example, a law enforcement officer may be issued with an NFC-tagged identification card, and each portable recording device may be equipped with an NFC unit identifier. Thus, the NFC-tagged identification card may include an officer identifier that identifies the law enforcement officer. Accordingly, during a check-out process, an NFC unit identifier may be scanned with an NFC reader within a Network Operations Center. Subsequently, the NFC-tagged identification card of the law enforcement officer may be scanned with the NFC reader in a predetermined amount of time to associate the officer with the portable recording device. Thus, the association information may be stored in the assignment table.

In another example, the assignment module 318 may receive a user input via an input interface of the CMM system 302 that assigns a portable recording device to a particular law enforcement officer. In this example, the assignment module 318 may record a user input of an assignment within the assignment table. In one example, a law enforcement officer may securely log in to the CMM system 302 and provide the assignment user input. In another example, the assignment may be performed by an administrator, at the back-end of the CMM system 302.

Further, the incident report form generation module 320 may automatically generate an incident report form for individual instances of multimedia data packets received from portable recording devices. The incident report form generation module 320 may generate an incident report form by including a link to segmented portions of a real-time data recording (i.e. real-time data may be segmented based on milestone indicator metadata), along with information associated with the metadata received from the portable recording device. Further, a law enforcement officer may enter or adjust information within the incident report form, such as case identifiers, pertinent individual personal information (i.e. name, address, date of birth, and/or so forth), category classifications, sub-category classifications, milestone indicator(s), audio annotations, text annotations, and/or so forth. The incident report form generation module 320 may further provide access to a read-writable version of the incident report form to a computing device associated with a law enforcement officer who was assigned to the portable recording device that captured the associated real-time data at a point in time that corresponds to the recording of the real-time data. By way of example, consider a first law enforcement officer, who was assigned a portable recording device, recording the first instance of real-time data at the first point in time. At a later date, the portable recording device may be re-assigned to a second law enforcement officer, and the second law enforcement officer may use the portable recording device to record the second instance of real-time data. In this example, the incident report form generation module 320 may generate incident report forms for the first and second instances of real-time data. However, the incident report form generation module 320 may provide the first law enforcement officer with access to a read-writable version of the incident report form for the first instance of real-time data, based on the recorded assignment at the point in time that the first instance of real-time data was captured. Similarly, the incident report form generation module 320 may provide the second law enforcement officer with access to a read-writable version of the incident report form for the second instance of real-time data.

Additionally, the data transfer module 322 may be configured to initiate receipt of, and receive multimedia data packets from, a portable recording device. The data transfer module 322 may be configured such that multimedia data packets may be transferred via an established, high-energy (secure) communication connection with a portable recording device. The multimedia data packets may include an aggregate of real-time data captured by a portable recording device along with associated metadata.

Moreover, the data store 324 may include one or more databases, such as relational databases, object databases, and/or key-value databases that store data. In one example, the data store 324 may store the real-time data captured by one or more portable recording devices, along with associated incident report forms, metadata, and any other additional descriptive data input provided by an assigned, law enforcement officer. The real-time data may be organized in the data store 324 according to corresponding assigned identifiers, such as a case identifier, event identifier, law enforcement officer identifier, and/or so forth.

Figure 4:
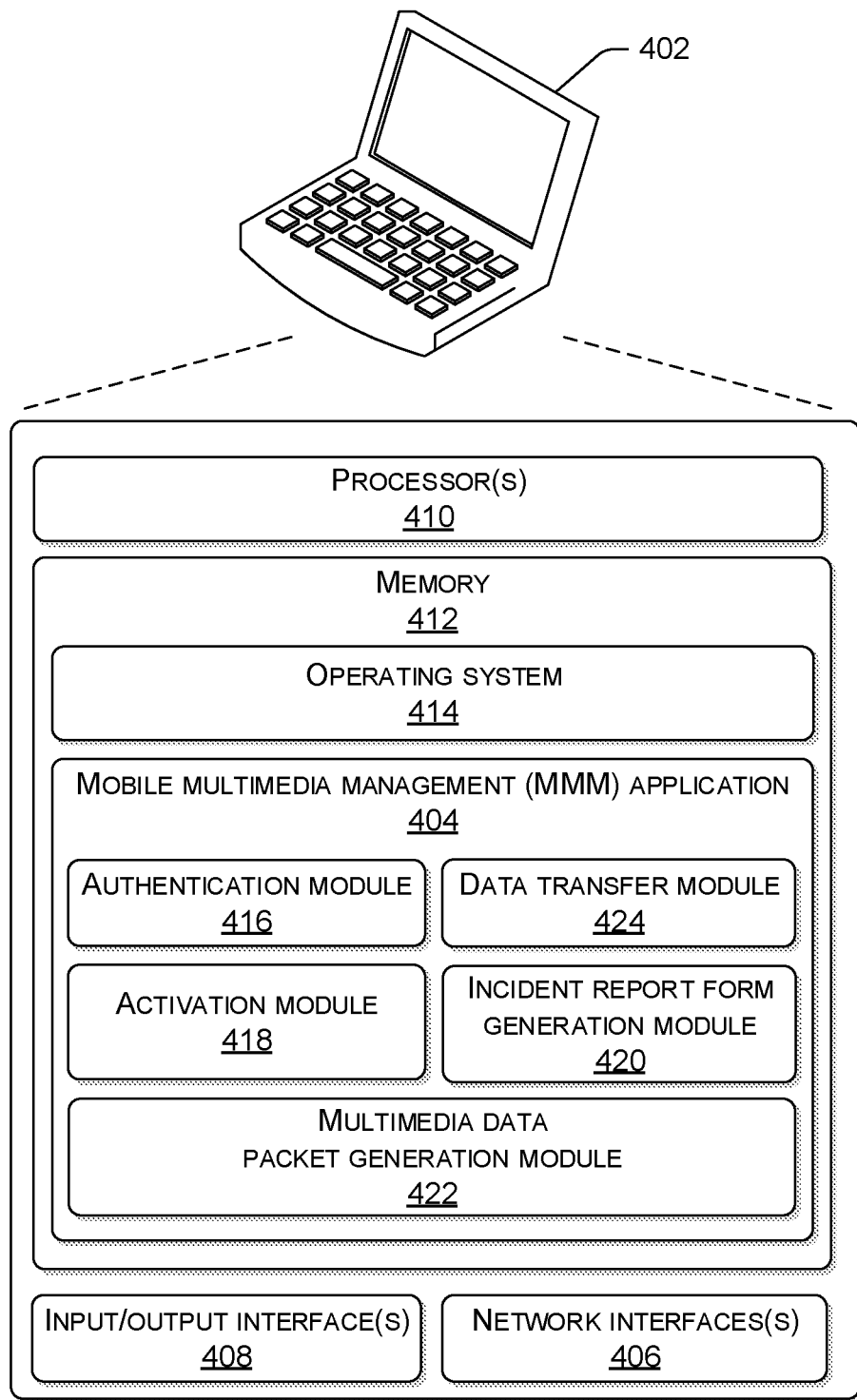
FIG. 4 illustrates a block diagram of various components of a mobile computing device that operates a Mobile Multimedia Management (MMM) application.

FIG. 4 illustrates a block diagram of various components of a mobile computing device 402 that operates a Mobile Multimedia Management (MMM) application 404. In some examples, a law enforcement officer may use the MMM application 404 to download a multimedia data packet that is associated with real-time data captured by a portable recording device assigned to the law enforcement officer. In doing so, the law enforcement officer may view the corresponding real-time data and/or generate an incident report form, based on the real-time data and associated metadata within the multimedia data packet. Thus, the law enforcement officer may annotate the incident report form by including audio annotations and/or text annotations via the mobile computing device operating the MMM application 404. In some examples, the audio annotations and/or text annotations may include descriptive data of an incident associated with the real-time data, an incident identifier, an event identifier, a case number, an involved party name, and/or so forth. Alternatively, the law enforcement officer may provide a code word that is pre-assigned to represent an incident, an event, or a case.

In the illustrated example, the MMM application 404 may further aggregate any descriptive data provided by the law enforcement officer via the mobile computing device, as additional metadata within a user-modified multimedia data packet. The MMM application 404 may further cause the mobile computing device 402 to transmit the user-modified multimedia data packet to the portable recording device. In this way, the incident report form and descriptive data provided by the law enforcement officer via the mobile computing device may be uploaded to the CMM system at a later point in time when the portable recording device is communicatively coupled to the CMM system via a high-energy (i.e. secure) communication connection. In some examples, the user-modified multimedia data packet may replace the original multimedia data packet on the portable recording device. In other examples, the user-modified multimedia data packet may be stored in conjunction with the original multimedia data packet.

In the illustrated example, the mobile computing device 402 may be coupled to a portable recording device via network interface(s) 406. The network interface(s) 406 may correspond to network interface(s) 206 and/or 304. In this example, the mobile computing device 402 may transmit one or more commands to a portable recording device via the network interface(s) 406 and further transmit and receive multimedia data packets to and from a portable recording device. The mobile computing device 402 may further include input/output interface(s) 408. The input/output interface(s) 408 may correspond to the input/output interface(s) 306.

Additionally, the mobile computing device 402 may include one or more processor(s) 410 operably connected to memory 412. The one or more processor(s) 410 may correspond to the one or more processor(s) 212 and/or 308, and the memory 412 may correspond to the memory 214 and/or 310. The memory 412 may further include an operating system 414, an authentication module 416, an activation module 418, an incident report form generation module 420, a multimedia data packet generation module 422, and a data transfer module 424. The operating system 414 may be any operating system capable of managing computer hardware and software resources. The authentication module 416 may correspond to the authentication module 314 of the CMM system 302, the activation module 418 may correspond to the activation module 316 of the CIVINI system 302, and the incident report form generation module 420 may correspond to the incident report form generation module 320 of the CMM system 302. It is noteworthy that the authentication module 416 may further determine whether the portable recording device is properly assigned to the law enforcement officer that is operating the mobile computing device 402. In this instance, the authentication module 416 may access an assignment table maintained by the assignment module 318 of the CCM system 302. Without a proper assignment, the authentication module 416 may not establish a secure communication connection with the portable recording device.

Further, the multimedia data packet generation module 422 may generate user-modified multimedia data packets by modifying multimedia data packets received from a portable recording device. The user-modified multimedia data packets may include any user modifications to the real-time data, and/or incident report forms generated via the mobile computing device 402. The incident report forms may be included within the user-modified multimedia data packets as additional metadata.

Moreover, the data transfer module 424 may be configured to initiate receipt of, and receive multimedia data packets from, a portable recording device. The multimedia data packets may include an aggregate of real-time data captured by a portable recording device along with associated metadata. Additionally, the data transfer module 424 may be further configured to transmit user-modified multimedia data packets to the portable recording device that includes incident report forms as additional metadata. The data transfer module 424 may be configured to transmit and receive multimedia data packets via an established, high-energy (secure) communication connection with a portable recording device.

Figure 5:
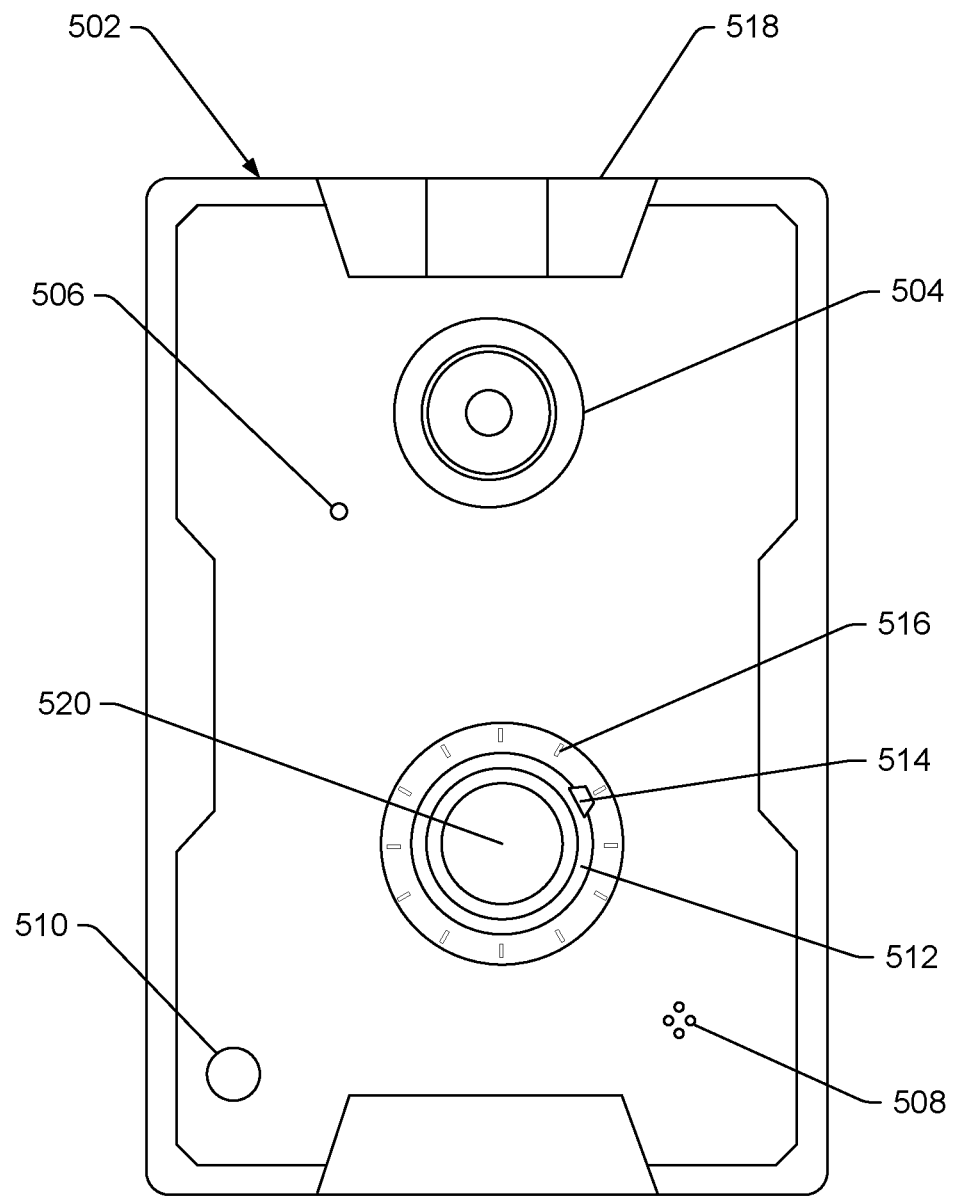
FIG. 5 illustrates an exemplary portable recording device.

FIG. 5 illustrates an exemplary portable recording device 502. In the illustrated example, the portable recording device 502 may also include a camera 504 for capturing video image data, and a microphone 506 for capturing audio and a speaker 508 for emitting audio. In some examples, the portable recording device 502 may also include a connectivity wakeup button 510 to selectively turn on and off wireless connectivity between the portable recording device 502 and one or more computing device(s) that are communicatively coupled via one or more network(s), such as a CSS system or a MSS system.

In the illustrated example, the portable recording device 502 includes a category selector that comprises a category wheel 512. The category wheel 512 may include an indicator tab 514 that can align with preset radial position(s) 516 on a front face of the portable recording device 502. In some examples, the indicator tab 514 may be configured to stop at a predetermined number of preset radial position(s) 516. Each of the preset radial position(s) 516 may correspond to a category classification that a user may assign to video and/or audio data captured by the portable recording device 502.

In one example, a user may use the category selector to assign a category classification prior to capturing the real-time video and/or audio data. In other examples, the user may use the category selector to select a category classification while the video and/or audio data is being captured. Alternatively, a category classification may be assigned within a predetermined time period after the video and/or audio data has been captured. In each of these instances, once the video and/or audio data has been captured, a controller within the portable recording device 502 may execute software instructions that associate the video and/or audio data with metadata that corresponds to the category classification. In some examples, the category selector may be used to further assign a sub-category classification to captured real-time data, as discussed in further detail below.

In an alternative embodiment, the category selector may include multiple category wheels, such as a second category wheel inset within the first category wheel. The second category wheel may be configured in a similar manner to the first category wheel, such that it may include an indicator tab that signposts a radial position of the wheel relative to the front-facing surface of the portable recording device 502. Each radial position of the second category wheel may correspond to a sub-category classification that depends on the category classification of the first wheel. For example, a user may turn a first category wheel to align the indicator tab with a radial position assigned to 'traffic citation.' The user may then turn the second category wheel to a radial position assigned to a sub-classification of 'stop sign infraction.' In another example, a user may turn the first category wheel to align the indicator tab with a radial position assigned to 'assist another agency.' Further, the second category wheel may be turned to align with a preset radial position assigned to the 'fire department.' In yet another example, a user may turn the first category wheel to align the indicator tab with a radial position assigned to 'detective.' Further, the second category wheel may be turned to align with a preset radial position assigned to 'arrest.'

In the illustrated example, the portable recording device 502 may further include a mode button 518. The mode button 518 may toggle between a normal and covert configuration. A normal configuration may indicate that the portable recording device 502 may emit audible information. A covert configuration may selectively mute audible output and emit a haptic output.

Additionally, the portable recording device 502 may include an activation button 520. The activation button 520 may be configured to cause the portable recording device 502 to perform one or more actions that depend on a present configuration of the portable recording device 502. For example, the one or more actions may include starting and stopping the capture of video and/or audio data, marking a point of interest while video and/or audio data is being captured, or confirming a selection made by a user while configuring the portable recording device 502. To assist a user of the portable recording device 502, the portable recording device 502 may include a speaker that emits an audible request for information and/or an audible confirmation of input made by a user. By way of example, the portable recording device 502 may be configured to audibly annunciate each category classification as a user (i.e. law enforcement officer) turns a category selector (i.e. category wheel) to align with each preset radial position. Further, the portable recording device 502 may be configured to select a category classification based on the user pressing the activation button 520 after aligning the category selector with a preset radial position. In doing so, the portable recording device 502 may audibly confirm the selected category classification.

Further, the portable recording device 502 may be further configured to audibly request a sub-classification following the selection of a category classification. For example, the user may, once again, turn the category wheel 512 to align the indicator tab 514 of the category wheel 512 with a particular preset radial position. In doing so, the portable recording device 502 may audibly annunciate each category sub-classification that corresponds to the preset radial position(s) 516 that aligns with the indicator tab 514 of the category wheel 512. Further, the portable recording device 502 may audibly confirm a selection of a sub-category classification in response to the user pressing the activation button 520 after having aligned to the indicator tab 514 of the category wheel 512 with a particular preset radial position. In some examples, the portable recording device 502 may be configured to forgo a sub-category selection in response to a lack of user input for a predetermined time interval, following an audible prompt to select a sub-category classification.

In various examples, the activation button 520 may be used to perform one or more actions. The one or more actions may correspond to user-initiated actions, such as initiating the capture of real-time data (i.e. video image data and/or audio data) by the portable recording device 502, initiating a category selection, or sub-category selection, to assign to real-time data, aggregating a milestone indicator within the stream of real-time data, or terminating the capture of real-time data. The selection of one or more actions may be based at least in part on the input form of user actuation of the activation button 520. User actuation of the activation button 520 may correspond to a double-click, single-click, long-click, or a short-click. A long-click may correspond to a case in which the activation button 520 is pressed and held for a predetermined period of time, and a short-click corresponds to a case in which the activation button 520 is pressed and held for less than the predetermined period of time. Although not limited as such, the predetermined time may be long enough so that a user can make a short-click conveniently, but not so long that the user must wait excessively for the long-click to be recognized.

By way of example, the portable recording device 502 may be configured such that a double-click of the activation button 520 may initiate the capture of the real-time data, whereas, a long, double-click of the activation button 520 may aggregate a milestone indicator within the stream of real-time data. In yet another example, a short, double-click of the activation button 520 may indicate confirmation of a selection made by a user (i.e. category or sub-category selection, initiating or terminating the capture of real-time data). Any input form of user actuation (i.e. double-click or single-click, and/or a short-click or long-click) may be assigned to any user-initiated action performed by the portable recording device 502.

Figure 6:
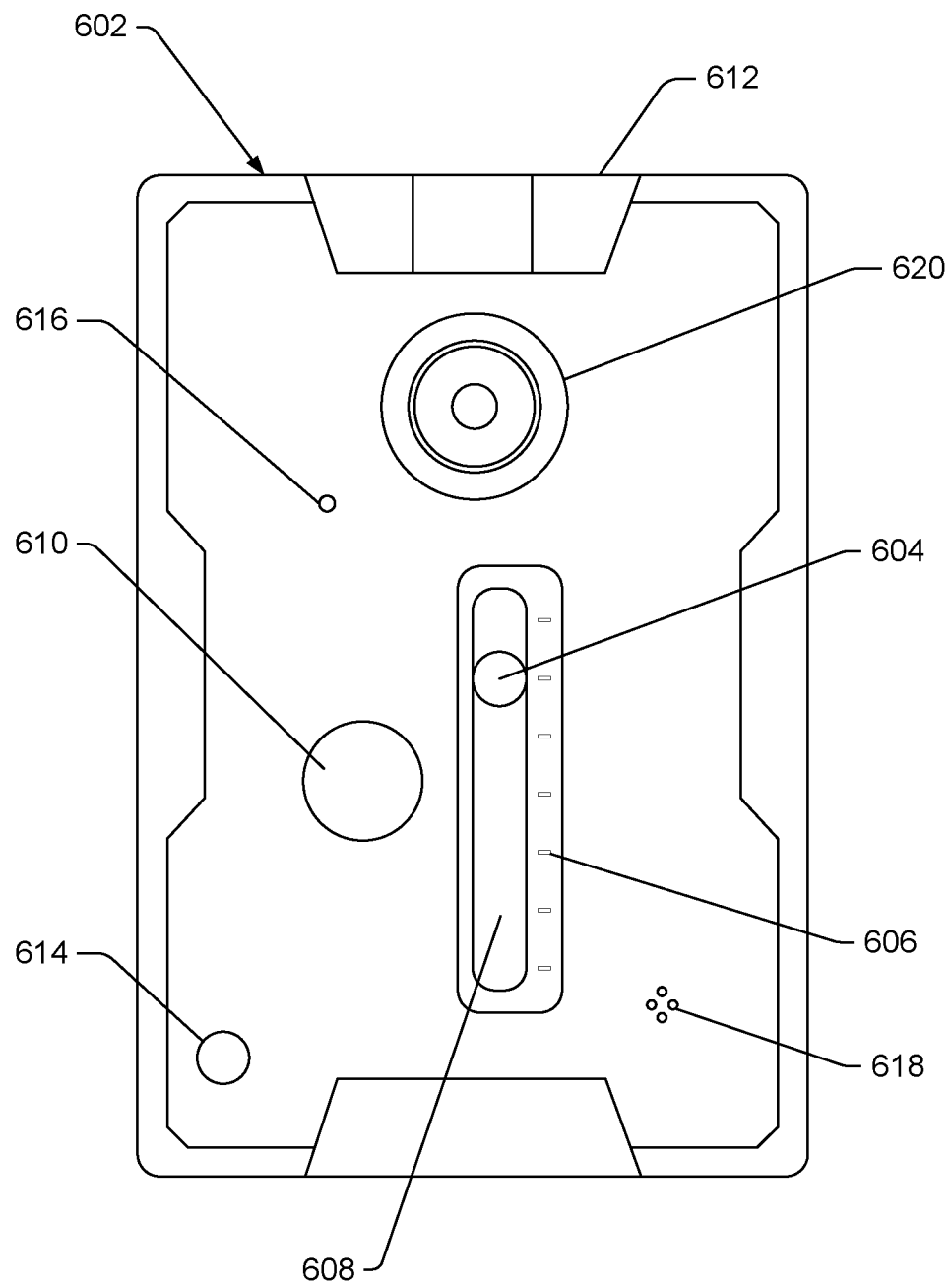
FIG. 6 illustrates an additional, exemplary portable recording device.

FIG. 6 illustrates an additional exemplary portable recording device 602. In this example, the category selector may comprise a slide indicator tab 604, rather than a category wheel 512, as illustrated in FIG. 5. In the illustrated example of FIG. 6, rather than turning a category wheel 512 to align an indicator tab 514 with preset position(s) 606, a slide indicator tab 604 may be manually slid within an elongated slot 608. The elongated slot 608 may include a predetermined number of preset position(s) 606 that each correspond to a category or sub-category classification. Each one of the preset position(s) 606 may be mechanically configured to stop the slide indicator tab 604 as it passes. Note that the slide indicator tab 604 configuration may cause the activation button 610 to be offset from its original position shown in FIG. 5.

Further, the activation button 610, mode button 612, connectivity wakeup button 614, microphone 616, speaker 618, and camera 620, substantially correspond to the activation button 520, mode button 518, connectivity wakeup button 510, microphone 506, speaker 508, and camera 504.

FIGS. 7, 8, 9, and 10 present processes 700, 800, 900, and 1000 that relate to operations of the portable recording device and central/mobile multimedia management systems. Each of the processes 700, 800, 900, and 1000 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 700, 800, 900, and 1000 are described with reference to the computing environment 100 of FIG. 1.

Figure 7:
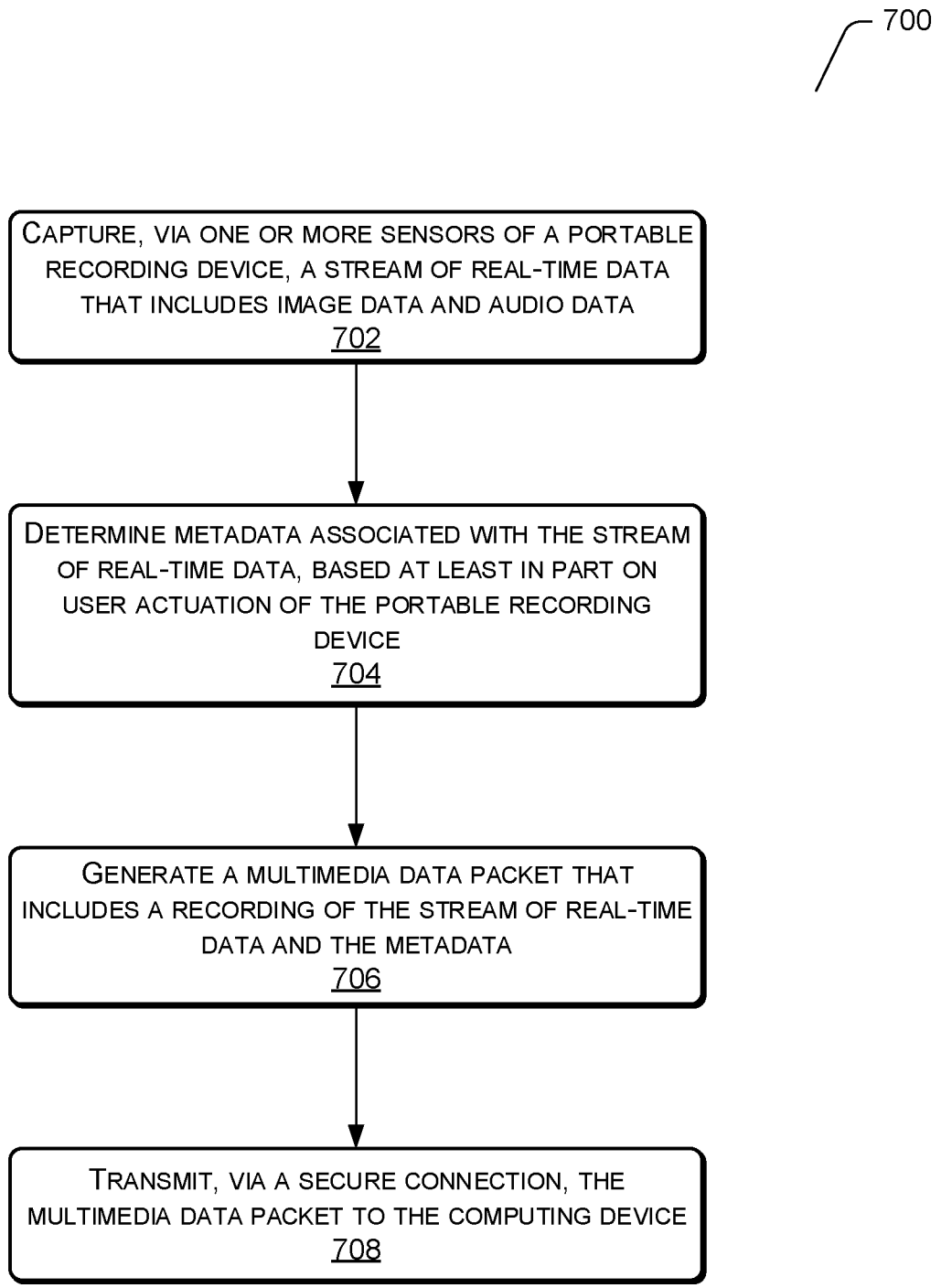
FIG. 7 illustrates a process for capturing real-time data via a portable recording device and transmitting the real-time data within a multimedia data packet to a computing device.

FIG. 7 illustrates a process of capturing real-time data via a portable recording device and transmitting the real-time data within a multimedia data packet to a computing device.

At 702, the portable recording device may capture, via one or more sensors, a stream of real-time data. The stream of real-time data may include video image data and audio data that reflects a user's point-of-view perception of their surroundings.

At 704, the portable recording device may determine metadata associated with the stream of real-time data, based at least in part on user actuation of the portable recording device. For example, the metadata may include a category classification and sub-category classification of the real-time data, along with one or more milestone indicator(s). The one or more milestone indicator(s) may correspond to points in time, during the stream of real-time data, that have been identified, by a law enforcement officer or assigned operator of the portable recording device, as being pertinent and/or significant to the incident, and as such may be addressed in detail by an audio annotation or text annotation within an ensuing incident report form.

At 706, the portable recording device may generate a multimedia data packet that includes a recording of the stream of real-time data and associated metadata. The associated metadata may include one or more of a category classification of the stream of real-time data, a sub-category classification, a timestamp and a date stamp associated with the capture of the real-time data, a GPS location of the portable recording device at a point in time that the real-time data was captured, or one or more milestone indicator(s) associated with points in time during the real-time data.

At 708, the portable recording device may transmit, via a secure communication connection, the multimedia data packet to a computing device. In one example, the computing device may correspond to a central multimedia management system within a network operations center. In another example, the computing device may be a mobile computing device of a law enforcement vehicle that operates a mobile multimedia management application.

Figure 8:
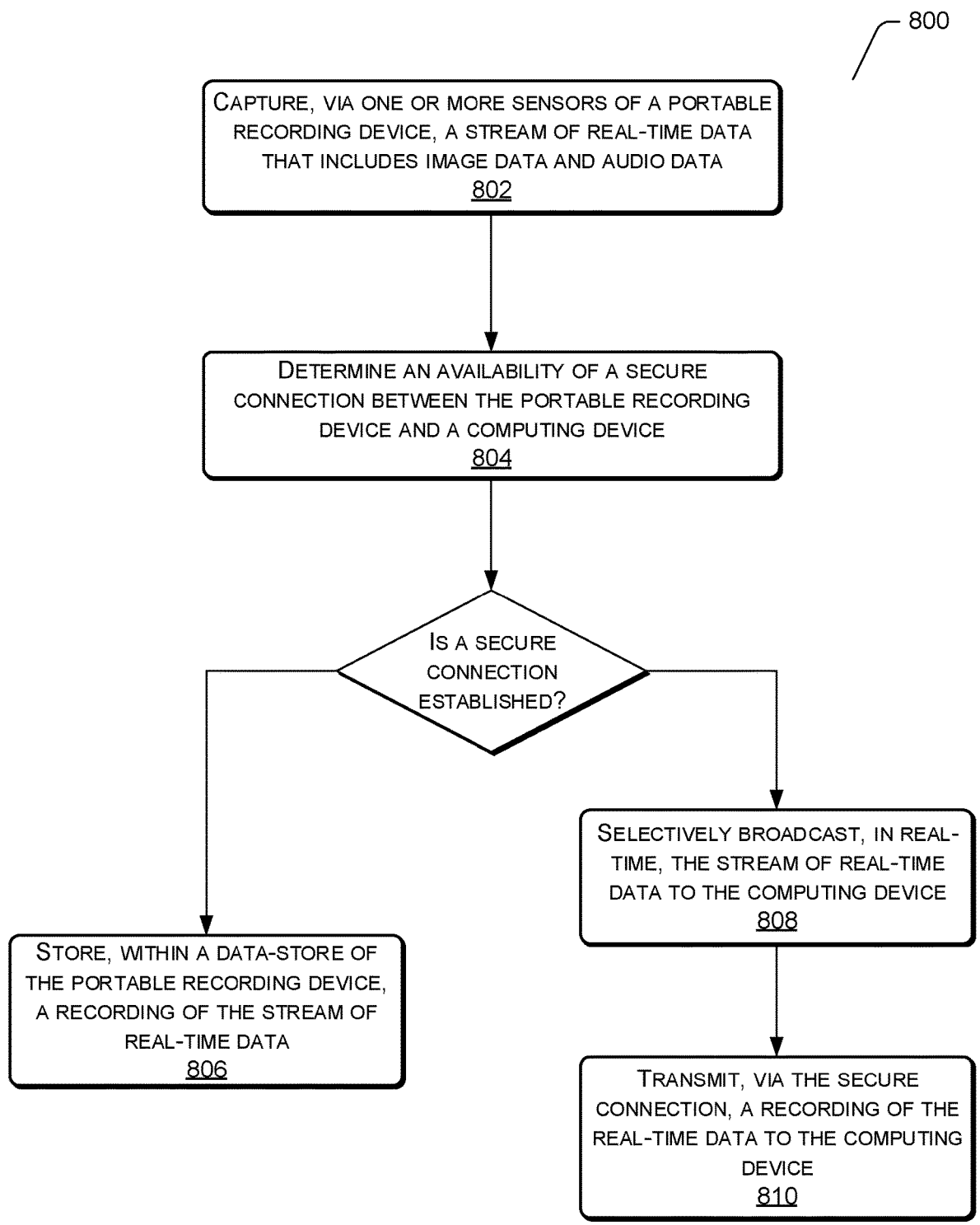
FIG. 8 illustrates a process for capturing real-time data via a portable recording device and selectively broadcasting a live stream a computing device via a high-energy (i.e. secure) communication connection.

FIG. 8 illustrates a process of capturing real-time data via a portable recording device and selectively broadcasting a live stream a computing device via a high-energy (i.e. secure) communication connection.

At 802, the portable recording device may capture, via one or more sensors, a stream of real-time data. The stream of real-time data may include video image data and audio data that reflects a law enforcement officer's point of view perception of their surroundings.

At 804, the portable recording device may determine the availability of a secure communication connection between the portable recording device and a computing device. In one example, the portable recording device may search for a secure communication connection by transmitting a heartbeat signal on a continuous basis or based on a predetermined schedule. The heartbeat signal may comprise a device identifier associated with the portable recording device.

At 806, the portable recording device may determine that a secure communication connection with a computing device is not available. Therefore, the portable recording device may store a recording of the stream of real-time data within a data store of the portable recording device.

At 808, the portable recording device may determine that a secure communication connection is available. More specifically, the portable recording device may receive a device identifier acknowledgment message that causes the portable recording device to transmit authentication data to the computing device via a low-energy (i.e. unsecured communication connection). In turn, the portable recording device may receive, from the computing device, a secure connection setting data packet that includes settings data for the portable recording device to establish a high-energy (i.e. secure) communication connection.

Further, the portable recording device may receive, from the computing device, a command to selectively broadcast in real-time, the stream of real-time data to the computing device. In response, the portable recording device may broadcast the stream of real-time data via the high-energy (i.e. secure) communication connection.

At 810, the portable recording device may transmit, via the high-energy (i.e. secure) communication connection, a multimedia data packet at a conclusion of the stream of real-time data. The multimedia data packet may include a recording of the stream of real-time data, along with associated metadata.

Figure 9:
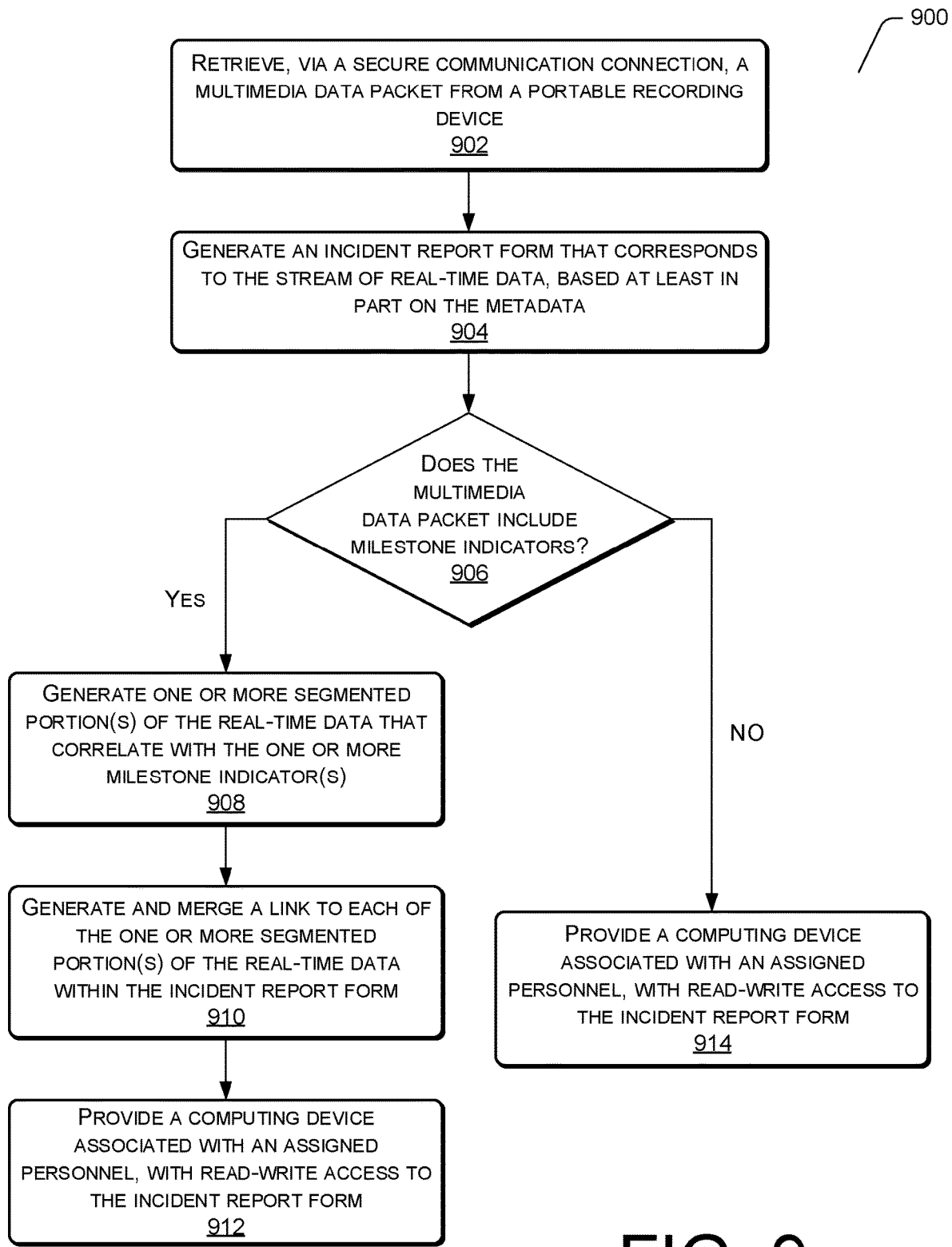
FIG. 9 illustrates a process of generating an incident report form that corresponds to a stream of real-time data captured by a portable recording device.

FIG. 9 illustrates a flow diagram of a process for generating an incident report form that corresponds to a stream of real-time data captured by a portable recording device. The incident report form may be generated by a central multimedia management (CMM) system.

At 902, the CMM system may retrieve, via a secure communication connection, a multimedia data packet from a portable recording device. The multimedia data packet may include a stream of real-time data and associated metadata.

At 904, the CMM system may generate an incident report form that corresponds to the stream of real-time data and associated metadata. For example, the computing device may automatically populate an incident report form using segmented portions of a real-time data recording (i.e. real-time data may be segmented based on milestone indicator metadata), along with metadata received from the portable recording device. By way of example, the computing device may automatically populate data such as a category classification, sub-category classification, milestone indicators, GPS location data of the portable recording device at a point in time that the real-time data was captured, and time stamp and/or date stamp data associated with the real-time data.

At 906, the CMM system may determine whether the metadata within the multimedia data packet includes one or more milestone indicators. Milestone indicator(s) are generated by the law enforcement officer by pressing an activation of the portable recording device while recording a stream of real-time data. The milestone indicator(s) are intended to flag a point in time during the stream of real-time data that the law enforcement officer has identified as being pertinent and/or significant to the incident, and as such may be addressed in detail within an incident report form.

At 908, the CMM may determine that the metadata within the multimedia data packet includes one or more milestone indicators. In doing so, the CMM system may generate one or more segmented portion(s) of the real-time data that correlate with the one or more milestone indicator(s). The time interval for each segmented portion may correspond to a predetermined time interval, or a time period until a next milestone indicator or a combination of both. By way of example, consider a multimedia data packet that includes a stream of real-time data along with corresponding metadata that includes two milestone indicators. In one example, the CMM system may generate three-segmented portions of the real-time data, based on the milestone indicators. A first segmented portion may commence with the beginning of the stream of real-time data until the first milestone indicator; the second segmented portion may span between the first milestone indicator and the second milestone indicator; and, a third segmented portion may span between the second milestone indicator and the end of the stream of real-time data. In another example, the CMM system may generate two segmented portions that each span a predetermined time interval after a milestone indicator.

At 910, the CMM system may generate and merge a link to each of the one or more segmented portion(s) of the real-time data within the incident report form. Further, the CMM system may configure the incident report form to permit a law enforcement officer, or authorized personnel, to provide an audio annotation or text annotation that relates to each milestone indicator. In this way, the incident report form may include a description of why the law enforcement officer determined a point in time during an incident was pertinent or significant to the recorded interaction, as well as a recording of the corresponding segmented portion of the real-time data.

At 912, the CMM system may provide access to a read-writable version of the incident report form to a computing device associated with an assigned law enforcement officer, or other assigned personnel. In some examples, the read-writable version of the incident report form may be restricted to the law enforcement officer that was assigned the portable recording device at the time the real-time data was captured. In some examples, the CMM system may determine an assignment of the portable recording device based at least in part on an assignment table that correlates identifiers of law enforcement officers, or otherwise authorized personnel, with device identifiers of portable recording devices.

Referring back to 906, the CMM system may determine that the multimedia data packet does not include milestone indicators. In doing so, the CMM system may provide access to a read-writable version of the incident report form to a computing device associated with an assigned law enforcement officer, or other assigned personnel.

Figure 10:
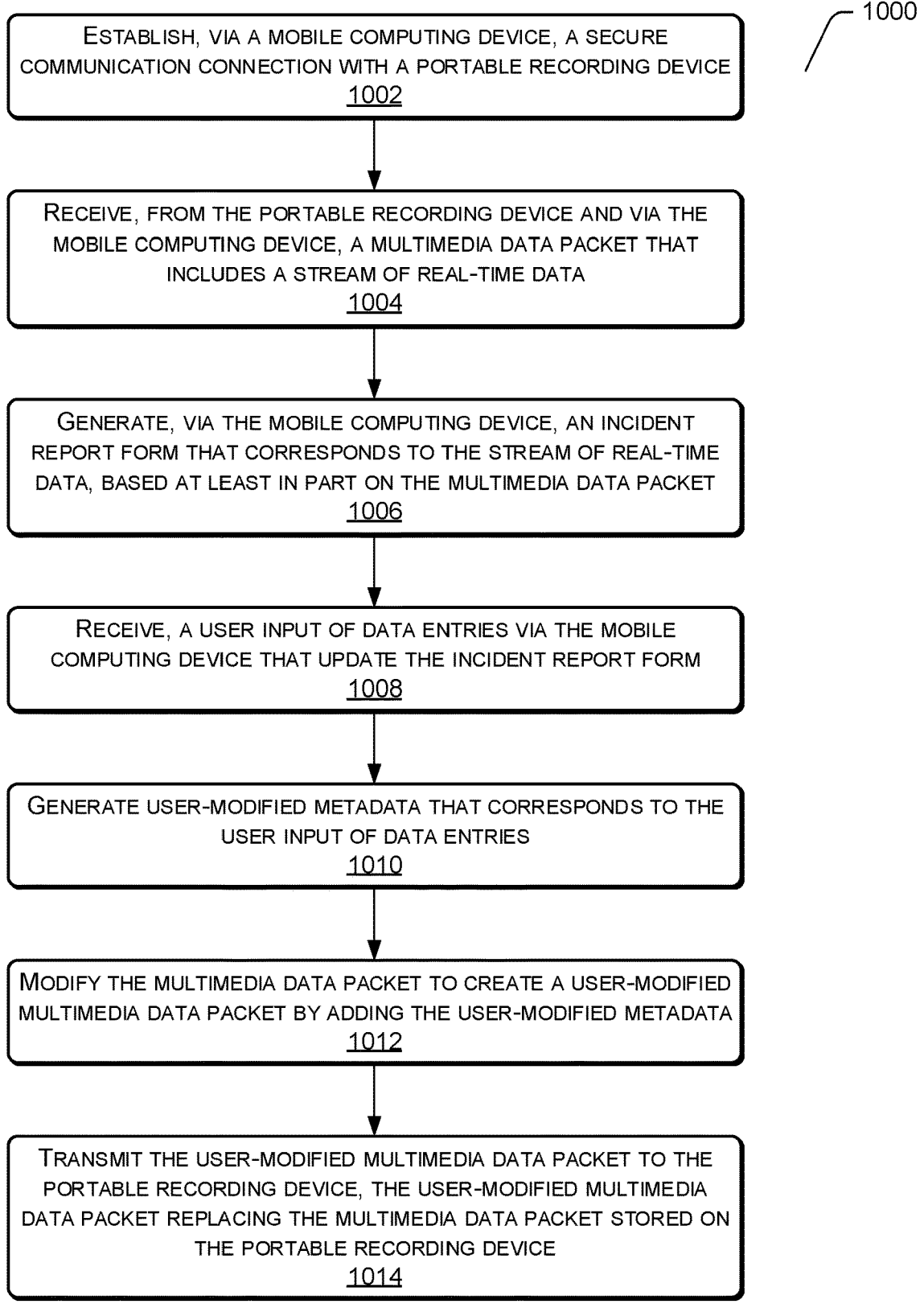
FIG. 10 illustrates a process of generating and transmitting a user-modified multimedia data packet to a portable recording device, via a MMM application operating on a mobile computing device.

FIG. 10 illustrates a process of generating and transmitting a user-modified multimedia data packet to a portable recording device, via a MMM application operating on a mobile computing device.

At 1002, the mobile computing device may establish a secure communication connection with a portable recording device. In one example, the portable recording device may act as a Wi-Fi access point and the mobile computing device may act as a Wi-Fi client. In another example, the mobile computing device may act as a Wi-Fi access point, and the portable recording device, as a Wi-Fi client.

At 1004, the mobile computing device may receive, from a portable recording device, a multimedia data packet that includes a stream of real-time data. In various examples, the mobile computing device may be associated with a law enforcement vehicle that is operated by a law enforcement officer assigned to operate the portable recording device.

At 1006, the mobile computing device, via an MMM application, may generate an incident report form that corresponds to the stream of real-time data and corresponding metadata. In some examples, the incident report form may include information derived from the portable recording device, such as category classifications, sub-category classifications, and one or more milestone indicator(s).

At 1008, the mobile computing device, via the MMM application, may receive a user input of data entries that enter or adjust information within the incident report form. The user input may include case identifier, pertinent individual personal information (i.e. name, address, date of birth, and/or so forth), category classifications, sub-category classifications, one or more milestone indicator(s), audio annotations, text annotations, and/or so forth.

At 1010, the mobile computing device, via the MMM application, may generate user-modified metadata based on the information entered or adjusted in creating the incident report form. In some examples, the user-modified metadata may include information that is different from the metadata that was included in the original multimedia data packet sent from the portable recording device.

At 1012, the mobile computing device, via the MMM application, may create a user-modified multimedia data packet by aggregating the user-modified metadata with the stream of real-time data and corresponding metadata that was originally sent to the mobile computing device from the portable recording device.

At 1014, the mobile computing device, via the MMM application, may transmit the user-modified multimedia data packet to the portable recording device, via the secure communication connection. In some examples, the user-modified multimedia data packet may replace the multimedia data packet that was originally sent by the portable recording device. The purpose of doing so is to ensure that the user-modified multimedia data packet is later uploaded from the portable recording device to the CMM system, rather than the multimedia data packet that does not include the user input of data entries. In this way, the user inputs of data entries are uploaded to the CMM system.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A portable recording device, comprising:
   an accessory housing;
   one or more sensors physically coupled to the accessory housing to capture real-time data from a surrounding environment;
   a category selector physically coupled to the accessory housing to selectively toggle, via user actuation, between two or more preset positions that designate category classifications assigned to user roles to the real-time data; and
   an activation button physically coupled to the accessory housing to selectively trigger one or more actions associated with the capture of the real-time data.

2. The portable recording device of claim 1, and wherein the one or more sensors further comprise:
   a camera configured to capture a first stream of real-time video image data of the real-time data;
   a microphone configured to capture a second stream of real-time audio data of the real-time data; and
   a speaker configured to broadcast a third stream of real-time audio data.

3. The portable recording device of claim 2, wherein the third stream of real-time audio data comprises at least one of an audible request for a user input or an audible confirmation of the user input.

4. The portable recording device of claim 1, wherein the one or more sensors further comprise a tactile feedback mechanism that causes a vibration of the accessory housing that corresponds to operations of the portable recording device.

5. The portable recording device of claim 1, further comprising:
   a mode button physically coupled to the accessory housing, the mode button being configured to selectively toggle, via user actuation, between an audio feedback preference or a tactile feedback preference.

6. The portable recording device of claim 1, wherein the category selector comprises a category wheel, the category wheel having an indicator tab, and
wherein the indicator tab is configured to signpost, via the user actuation, the two or more preset positions in response to the user actuation of the category wheel, the two or more preset positions marked on a front face of the portable recording device and further situated radially about the category wheel.

7. The portable recording device of claim 1, wherein the category selector comprises a slide indicator tab that is configured to slide within an elongated slot etched into a front face of the portable recording device, the slide indicator tab being further configured to signpost the two or more preset positions in response to the user actuation of the slide indicator tab, the two or more preset positions marked on the front face of the portable recording device adjacent to the elongated slot.

8. The portable recording device of claim 1, wherein the activation button is configured to receive a plurality of input forms of the user actuation, wherein individual ones of the plurality of input forms of the user actuation correspond to individual actions of the one or more actions, and wherein the plurality of input forms of the user actuation comprise at least a double-click, single-click, long-click, or a short-click.

9. The portable recording device of claim 1, further comprising:
a controller physically coupled to the accessory housing to generate multimedia data that comprises at least the real-time data; and
a wireless transceiver physically coupled to the accessory housing to transmit the multimedia data to a computing device associated with the portable recording device.

10. A portable recording device, comprising:
an accessory housing;
one or more sensors physically coupled to the accessory housing to capture a stream of real-time data from an environment surrounding the portable recording device;
one or more buttons physically coupled to the accessory housing to control the capture of the stream of real-time data;
a category selector physically coupled to the accessory housing to selectively classify the stream of real-time data to a preset category classification among one or more preset category classifications assigned to corresponding user roles;
a controller physically coupled to the accessory housing to generate multimedia data that comprises at least the stream of real-time data and an association to the preset category classification; and
a wireless transceiver physically coupled to the accessory housing to transmit the multimedia data to a computing device associated with the portable recording device.

11. The portable recording device of claim 10, wherein the one or more buttons include a mode button to selectively toggle, via user actuation, between an audio feedback preference or a tactile feedback preference.

12. The portable recording device of claim 10, wherein the category selector comprises a first category wheel and a second category wheel, the second category wheel being inset within the first category wheel,
wherein the first category wheel includes a first indicator tab that is configured to signpost, via user actuation of the first category wheel, one of a plurality of radial preset positions on a front face of the portable recording device, and
wherein the second category wheel includes a second indicator tab that is configured to signpost, via user actuation of the second category wheel, one of the plurality of radial preset positions.

13. The portable recording device of claim 12, wherein the first category wheel is configured to designate a category classification to the stream of real-time data, and the second category wheel is configured to designate a sub-category classification of the category classification to the stream of real-time data.

14. The portable recording device of claim 10, further comprising:
a wake-up button physically coupled to the accessory housing, the wake-up button being configured to selectively activate and de-activate the wireless transceiver.

15. A electronic device for capturing a stream of real-time multimedia, comprising:
an accessory housing;
sensors configured to capture a stream of real-time multimedia data;
a category selector physically coupled to the accessory housing to selectively designate, via user actuation, a category classification among one or more category classifications assigned to corresponding user roles to the stream of real-time multimedia data; and
a controller physically coupled to the accessory housing to generate multimedia data that comprises the stream of real-time multimedia data and the designated category classification.

16. The electronic device of claim 15, wherein the category selector comprises a slide indicator tab that is configured to slide within an elongated slot etched into a front face of the electronic device, the slide indicator tab being further configured to signpost one or more preset positions marked on the front face of the electronic device.

17. The electronic device of claim 15, further comprising:
a wireless transceiver physically coupled to the accessory housing to transmit the stream of real-time multimedia data to a computing device associated with the electronic device.

18. The portable recording device of claim 1,
wherein the category selector comprises a first category wheel and a second category wheel; and
wherein the first category wheel is configured to designate the category classifications to the stream of real-time data, and the second category wheel is configured to designate sub-category classifications of the category classifications to the stream of real-time data.

19. The portable recording device of claim 10,
wherein the category selector comprises a first category wheel and a second category wheel; and
wherein the first category wheel is configured to selectively classify the stream of real-time data to the preset category classification, and the second category wheel is configured to selectively classify the stream of real-time data to a preset sub-category classification among one or more preset sub-category classifications of the category classifications.

20. The electronic device of claim 15,
wherein the category selector comprises a first category wheel and a second category wheel; and
wherein the first category wheel is configured to selectively designate the category classifications to the stream of real-time data, and the second category wheel is configured to selectively designate sub-category classifications of the category classifications to the stream of real-time data.

\* \* \* \* \*